Nov. 20, 1962   A. M. SPOUND ETAL   3,065,029
HEADREST CONSTRUCTION
Filed Nov. 2, 1960                  3 Sheets-Sheet 1
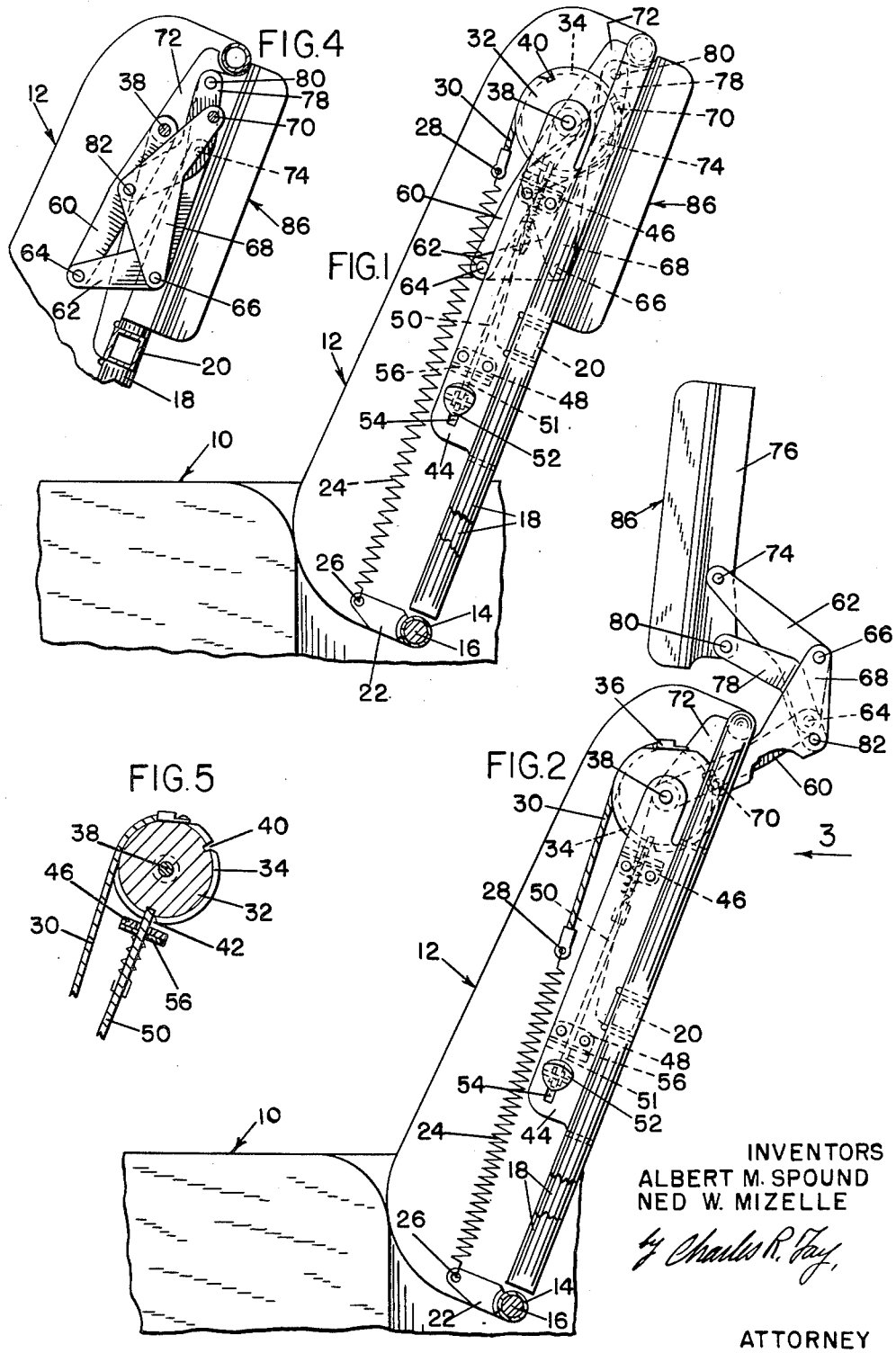
INVENTORS
ALBERT M. SPOUND
NED W. MIZELLE
by Charles R. Fay
ATTORNEY

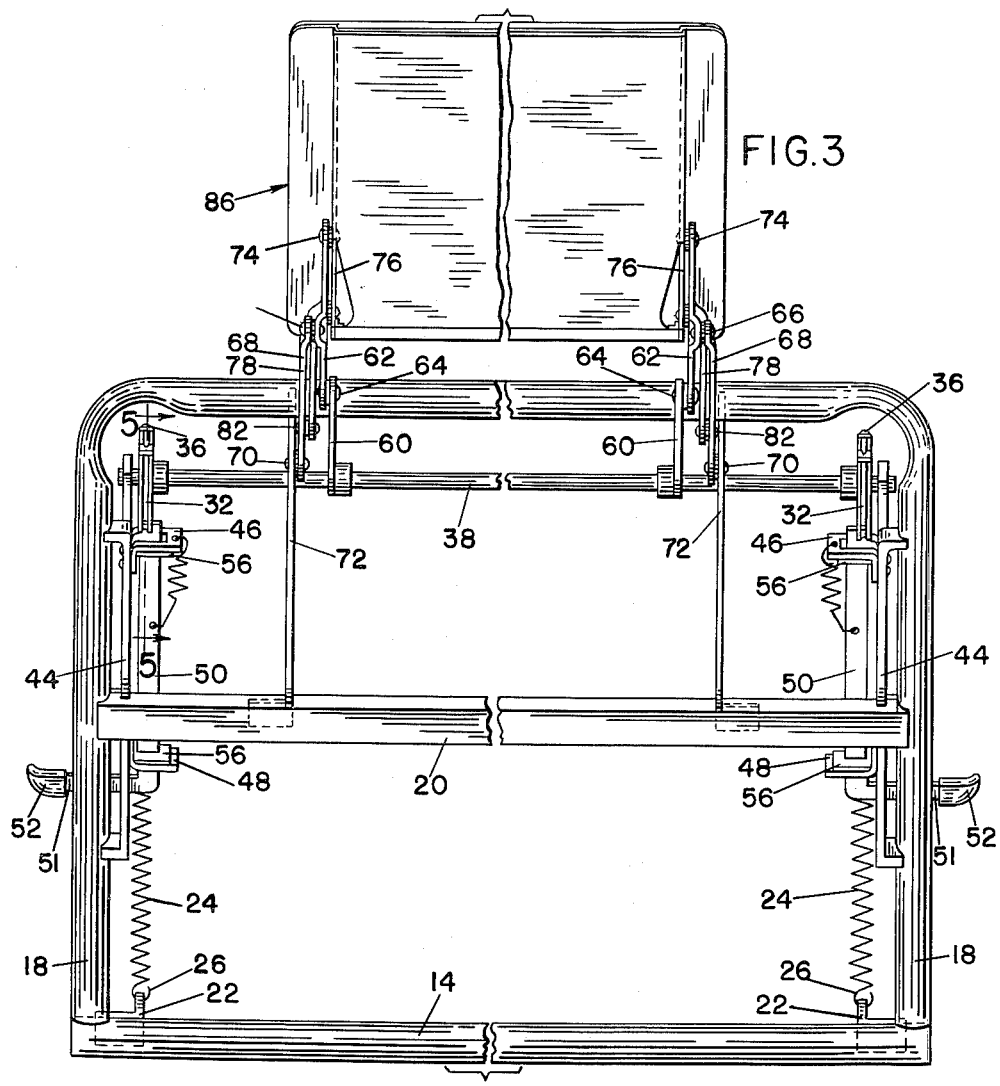

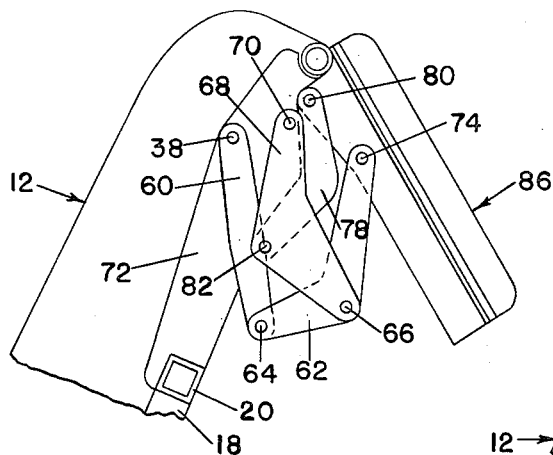
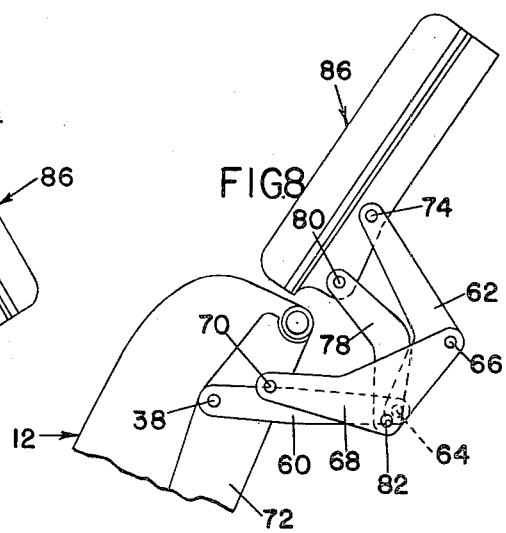
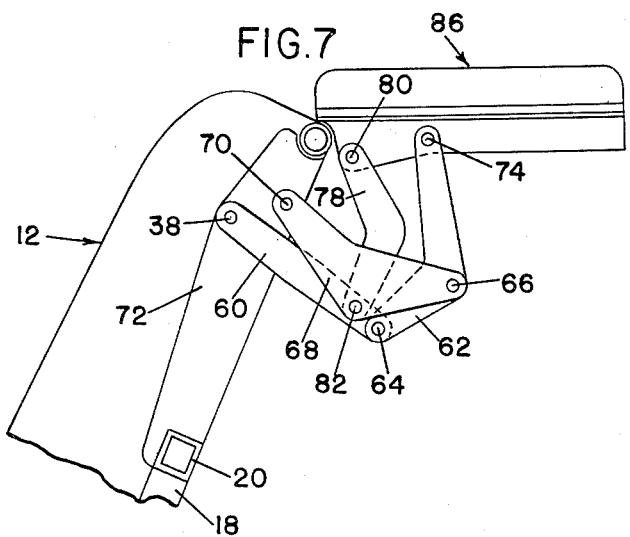

United States Patent Office 3,065,029
Patented Nov. 20, 1962

3,065,029
HEADREST CONSTRUCTION
Albert M. Spound, Wellesley Hills, Mass., and Ned Worth Mizelle, High Point, N.C.; said Mizelle assignor to said Spound
Filed Nov. 2, 1960, Ser. No. 66,847
10 Claims. (Cl. 297—391)

This invention relates to a new and improved headrest construction particularly adapted for chairs or seats which are provided with reclining backrests and as an example attention is directed to the conventional rearwardly swingable backrest used in certain automobiles; and the general purpose of the present invention is to provide such a movable or reclining backrest with a headrest which is automatically movable under means such as a spring at the will of the occupant from a substantially concealed folded position generally at the rear of the seat to a fully extended up and forward position at the top of the backrest, so that the occupant may lean back and find support for his head in any position of the seat between more or less upright in seating relation and inclined to its fullest extent downwardly to a sleeping condition, it being pointed out that most backrests of the type described have several different locations wherein they may be latched for adjustment of the inclination of the backrest with respect to the seat.

Other objects of the invention include the provision of a headrest as above described which is mounted on the backrest to swing thereon in a completely reversed relationship thereto about an angle of 180° or more, and means mounting the headrest including a pair of swingbars pivoted at fixed points on said backrest, each swingbar being connected to a control bar, the bars being interrelated in such a way as to cause the backrest to be swung upwardly from its position at the rear of the backrest in a reversed position over the top of the backrest into useful condition, and including means for so moving said headrest, said means including a device as for instance a spring normally restrained from acting by means of a latch or similar device, there being means under the control of the occupant for releasing said latch so that said headrest automatically extends upwardly as aforesaid.

Further objects of the invention include the provision of an automatically actuated headrest as above described which is actuated from its folded to its useful condition by means of a tension spring or resilient device and which however is manually returnable to its original position during which action the levers, etc. act to place the spring under constraint so that it is immediately ready to once more operate upon release of the manually actuated means described for this purpose.

The invention further relates to arrangements and combinations of parts which will be hereinafter described and more particularly set forth in the appended claims.

Reference is to be had to the accompanying drawings, in which

FIG. 1 is a view in side elevation showing the invention with the headrest folded;

FIG. 2 is a similar view showing the headrest fully extended to useful position;

FIG. 3 is a rear elevational view looking in the direction of arrow 3 in FIG. 2;

FIG. 4 is a partial view similar to FIG. 1 but with parts removed for clarity;

FIG. 5 is a section on line 5—5 of FIG. 3; and

FIGS. 6, 7 and 8 are diagrammatic views showing the extension of the headrest progressively between the FIG. 1 and FIG. 2 positions.

In carrying out the present invention, the same is shown as applied to the backrest of a seat or chair, which backrest is mounted for swinging motion from a generally upright sitting condition through several degrees of adjustment toward the rear for reclining, it being pointed out that in the case of a vehicle the backrest is also locatable generally horizontally so that it extends between and fills the gap between the front seat and the rear seat of the vehicle. The seat is generally indicated at 10 and this may be stationary or movable as desired, and the backrest is generally indicated at 12. The backrest is generally mounted to pivot on a bottom rail or the like which is indicated at 14, this bottom rail being generally rotatable or oscillatable on a shaft 16.

The backrest has a general framework which may comprise side rails such as at 18, these being connected by crossbars or the like as may be required or necessary, such being exemplified for instance by the rectangular member 20 shown in the drawings. Of course constructions of this nature may be varied to any degree desired and may be completely contained and concealed by the upholstery as is the case with the mechanism which is to be described.

The lower rail 14 has secured thereto in fixed relation a spring bracket 22 to which a spring such as is indicated at 24 may be connected at one end such as 26. Spring 24 is connected at its other end as at 28 to a cable or the like 30 which extends to the periphery of a grooved pulley 32, the groove of which is indicated by the reference numeral 34. The cable 30 may be secured to the pulley 32 as by any convenient and well known means 36.

The pulley 32 is fixed to a rock shaft or rod 38 in any desired way and the lock pulley is provided with a series of peripheral notches 40, 42, see FIG. 5. The oscillating shaft or rod 38 may be mounted as for instance by side plates 44 forming a part of the framework 18, 20 and in any event attached thereto.

The plate 44 is provided with a pair of apertured brackets 46, 48 which vertically guide a latch member 50 having a laterally extending angle member at the bottom thereof as at 51, there being a fingertip or grip member 52 mounted on the laterally extending member 51 which extends through a slot 54 so that the latch plate 48 may be moved up-and-down for engagement selectively with the respective notches 40 and 42 in the lock pulley 32. The brackets 46 and 48 may be provided with guide means or bushings conveniently made of plastic as indicated at 56 so as to form bearings for the reciprocatory action of the latching member 48 in its relationship to latching and unlatching the lock pulley 32 which of course is rotatable in one direction under influence of the spring 24.

Fast to the operating rock shaft or rod 38 there is a lever 60 which of course oscillates with the shaft or rod 38. Pivotally mounted at the oposite end of the lever 60 there is another lever which is indicated at 62 and is connected thereto as for instance by a rivet 64. The lever 62 is more or less in the form of a bellcrank and intermediate the ends thereof as at 66 is pivoted to another lever 68 at one end of the latter, the other end of lever 68 being pivoted as at 70 to a fixed point provided as for instance by means of a supporting bracket 72.

The opposite end of lever 62 is pivotally mounted as at 74 to a part of the headrest which is indicated by the reference numeral 76. There is another lever 78 pivoted at 80 to the headrest member 76 and also pivoted as at 82 to lever 68.

In other words, lever 60 is fixed to shaft 38 and is connected to lever 62 at one end thereof as at 64; the lever 68 is pivoted at a point 70 on the supporting bracket 72; and the axes of the shaft or rod 38 and point 70 are offset from each other as are the axes of the points 74 and 80.

Lever 68 is connected to lever 78 at 82 which is generally centrally of the lever 68 but at one end of the lever 78, and lever 68 is connected to lever 62 generally centrally of the lever 62 but at the end of lever 68 as at 66.

It is believed that the action of these members will be apparent by a comparison of the several figures 6, 7 and 8, which show the arc of motion of all of these members between the fully folded condition of FIG. 1 to the fully extended condition of FIG. 2. The levers at 60 and 68 may be referred to as "swing" levers, whereas the levers 62 and 78 may be referred to as "control" levers.

The part 76 of the headrest may be a dish or pan-shaped rigid member to which is connected a cushion member generally indicated at 86 and the part 86 is housed generally within a cavity at the rear surface of the backrest when it is in folded condition as in FIG. 1, but this is completely reversed through a more than 180° arc when the parts are moved under influence of the spring 24 to the fully extended condition of FIG. 2.

If the headrest is extended as in FIG. 2, it is merely necessary to push downwardly on the knob or fingergrip 52 to release the upper end of the latch mechanism rod 48 from its notch 42 in the lock pulley 32 and then to manually move the entire headrest in a clockwise direction all the way to the FIG. 2 showing, when the upper end of latch part 48 will engage the notch 40 in the locking pulley. In this condition the part 86 of the headrest is more or less generally concealed within the confines of the backrest although the portion 76 of the headrest may extend outwardly therefrom to a small degree. The parts may be fully concealed if the backrest is made a little thicker.

When the occupant is seated and wishes to take advantage of the use of the headrest, all he has to do is to push downwardly on fingergrip 52, releasing the upper end of the latch rod 48 from the notch 40, whereupon the spring will immediately cause the entire headrest to be swung around from FIG. 1 position to the FIG. 2 condition when it is fully extended and ready for use.

It is to be understood that the occupant may move the backrest completely independently of the headrest and the backrest may be put down to a horizontal bed condition with the headrest completely concealed and not in use, but at any inclination or even in the sitting up position, the occupant is enabled to take advantage of the headrest if he so wishes, or he can manually move it back down out of the way if he wants to.

Having thus described our invention and the advantages thereof, we do not wish to be limited to the details herein described, otherwise than as set forth in the claims, but what we claim is:

1. A seat construction comprising a seat and a backrest, means providing for tilting of the backrest from a seating to a reclining position, movable means mounting a headrest on said backrest, means for actuating the mounting means to project said headrest from a normal folded condition to useful extended condition thereof with respect to the backrest, and control means for actuating said headrest moving means at will, said last-named means including a resilient member and the control means including releasable means to hold the same restrained, the resilient members being located wholly on the backrest and moving therewith in undisturbed condition.

2. A seat construction comprising a seat and a backrest, means providing for tilting of the backrest from a seating to a reclining position, movable means mounting a headrest on said backrest, means for actuating the mounting means to project said headrest from a normal folded condition to useful extended condition thereof with respect to the backrest, and control means for actuating said headrest moving means at will, said last-named means including a resilient member and the control means including releasable means to hold the same restrained, said headrest mounting means including a series of inter-connected levers generally mounted in pivotal relation on the backrest and connected to the headrest, said levers comprising a pair of levers pivoted to the backrest and a pair of levers pivoted to the headrest, said two pairs of levers being interpivoted.

3. A reclining chair construction comprising a stationary frame, a backrest swingably mounted thereon for disposition between sitting and reclining positions thereof, said backrest having a forward surface, a headrest movably mounted on the backrest at the rear thereof for projection upwardly and forwardly relative to said backrest for disposition in useful relationship with the forward surface, means for projecting said headrest to useful condition, said projecting means comprising a pair of swing levers mounted on the backrest at corresponding ends and connected to the headrest, a driving member mounted in said backrest, said driving member comprising an elongated rod, a fixed connection between said elongated rod and at least one of said swing levers, a resilient spring normally urging said rod in a direction so as to swing the levers to project said headrest, a manually operable latch for the rod holding the same against the action of the spring, said rod being swingable bodily with the backrest motion, and manual means for releasing said latch so that the rod and levers will project said headrest under influence of said spring regardless of the position of the backrest, said latch releasing means being mounted independently of the stationary frame.

4. The reclining chair construction of claim 3 wherein the rod is oscillatable under influence of the spring.

5. A seat construction comprising a frame, a backrest swingably mounted thereon for disposition between sitting and reclining positions thereof, said backrest having a smooth continuous forward surface and a partial cavity at the rear surface thereof, a headrest movably mounted for at least partial concealment in the cavity or for selective projection upwardly and forwardly relative to said backrest for disposition in useful relationship therewith, means for projecting said headrest to useful condition, said means comprising a pair of parallel levers mounted on the backrest at corresponding ends and connected to the headrest, a driving member mounted in said backrest, said driving member comprising a shaft, a connection between said shaft and at least one of said parallel levers, a resilient spring normally urging said shaft in a direction so as to project said headrest, a manually operable latch holding the shaft against the action of the spring, and means for releasing said latch so that the shaft will project said manual headrest under influence of said spring regardless of the position of the backrest.

6. The reclining chair recited in claim 5 wherein said latch is located on said backrest and including a movable member, a finger grip therefor, a lock pulley having notches in its periphery for reception of one end of the movable latch member, said lock pulley being fast to the shaft and the spring being connected to the lock pulley.

7. A seat construction comprising a frame, a backrest swingably mounted thereon for disposition between sitting and reclining positions thereof, said backrest having a smooth continuous forward surface, a headrest movably mounted at the rear of the backrest for selective projection upwardly and forwardly relative to said backrest for disposition in useful relationship therewith, means for swinging said headrest to useful condition, said means comprising a pair of swinging levers pivoted to the backrest at corresponding ends, a pair of control levers pivoted to the headrest, said pairs of levers being interpivoted, a driving member mounted in said backrest, a connection between said driving member and at least one of said parallel levers, a resilient spring normally urging said driving member in a direction so as to project said headrest, a manually operable latch independent of the frame holding the driving member against the action of the spring, and means for releasing said latch so that the driving member will project said manual headrest under influence of said spring regardless of the position of the backrest.

8. A seat construction comprising a frame, a seat thereon, a backrest movably mounted on said frame for disposition between reclining and sitting positions thereof, a headrest mounted on said backrest, means mounting said headrest for projection of the headrest from a position at the rear of the backrest to a useful head-supporting condition wherein the headrest is generally in prolongation of the backrest, and means for actuating the headrest mounting means under control of the occupant of the seat, said means comprising a power device, means normally restraining said power-operated device from operation thereof, and manually operated means for releasing said restraining means so as to allow the power-operating means to actuate said headrest mounting means for the said projection, the means for releasing the restraining means being independent of the frame.

9. An article of manufacture comprising a seating construction including a frame, a seat, a backrest thereon, means providing for tilting of the backrest between seating and reclining positions thereof, a movable headrest mounted upon said backrest, means mounting the headrest on the backrest for disposition between a position at the rear of the backrest to a fully-projected exposed useful condition, means under control of the occupant for actuating the means for moving the headrest at will to the projected position thereof regardless of the inclination of the backrest with respect to the seat or frame, said last-named means including a driving member, a first swing lever secured thereto and swingable thereby, spring means to move the driving member, a latch for said spring means to hold the same normally against the action of the spring, a second swing lever, said second lever being mounted on the backrest on an axis spaced from the axis of the first lever, a pair of control levers respectively mounted pivotally with respect to said first-named levers, said control levers being pivotally connected to the headrest, partial rotation of said driving member causing motion of said swing levers and therefore the control levers to project said headrest from an inverted position at the rear of the backrest to a forwardly-facing position at the top of the backrest.

10. An article of manufacture comprising a seating construction including a frame, a seat, a backrest thereon, means providing for tilting of the backrest between seating and reclining positions thereof, a movable headrest mounted upon said backrest, means mounting the headrest on the backrest for disposition between a position at the rear of the backrest to a fully-projected exposed useful condition, means under control of the occupant for actuating the means for moving the headrest at will to the projected position thereof regardless of the inclination of the backrest with respect to the seat or frame, said last-named means including a rotary driving member, a first swing lever secured thereto and actuatable thereby, spring means to move the driving member, a latch for said spring means to hold the same normally against the action of the spring, a second swing lever, said second lever being mounted on the backrest on an axis spaced from the axis of the first lever, a pair of control levers respectively mounted pivotally with respect to said first-named levers, said control levers being pivotally connected to the headrest, motion of said driving member under influence of the spring means causing motion of said swing levers and therefore the control levers to project said headrest from an inverted position at the rear of the backrest to a forwardly-facing position at the top of the backrest.

References Cited in the file of this patent
UNITED STATES PATENTS

| | | |
|---|---|---|
| 2,273,428 | Bank | Feb. 17, 1942 |
| 2,732,888 | Jones | Jan. 31, 1956 |
| 2,744,566 | Schmidt | May 8, 1956 |
| 2,952,303 | Spound et al. | Sept. 13, 1960 |